April 14, 1964     R. D. SMITH     3,128,761

ROLLER-MASSAGING MACHINE

Filed Oct. 22, 1962     3 Sheets-Sheet 1

INVENTOR.
ROBERT D. SMITH
BY
*ATTORNEY*

April 14, 1964  R. D. SMITH  3,128,761
ROLLER-MASSAGING MACHINE
Filed Oct. 22, 1962  3 Sheets-Sheet 2
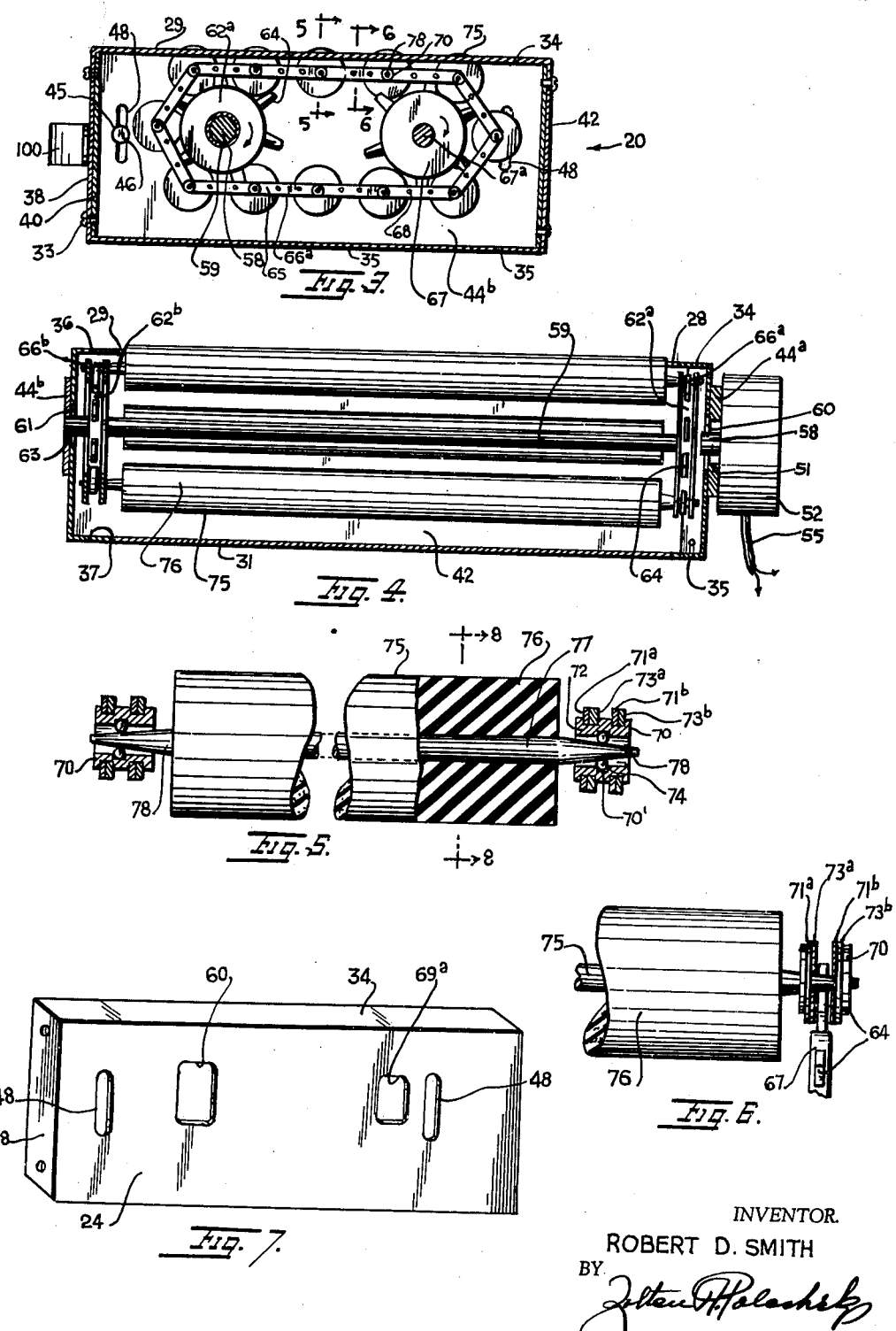
INVENTOR.
ROBERT D. SMITH
BY
ATTORNEY

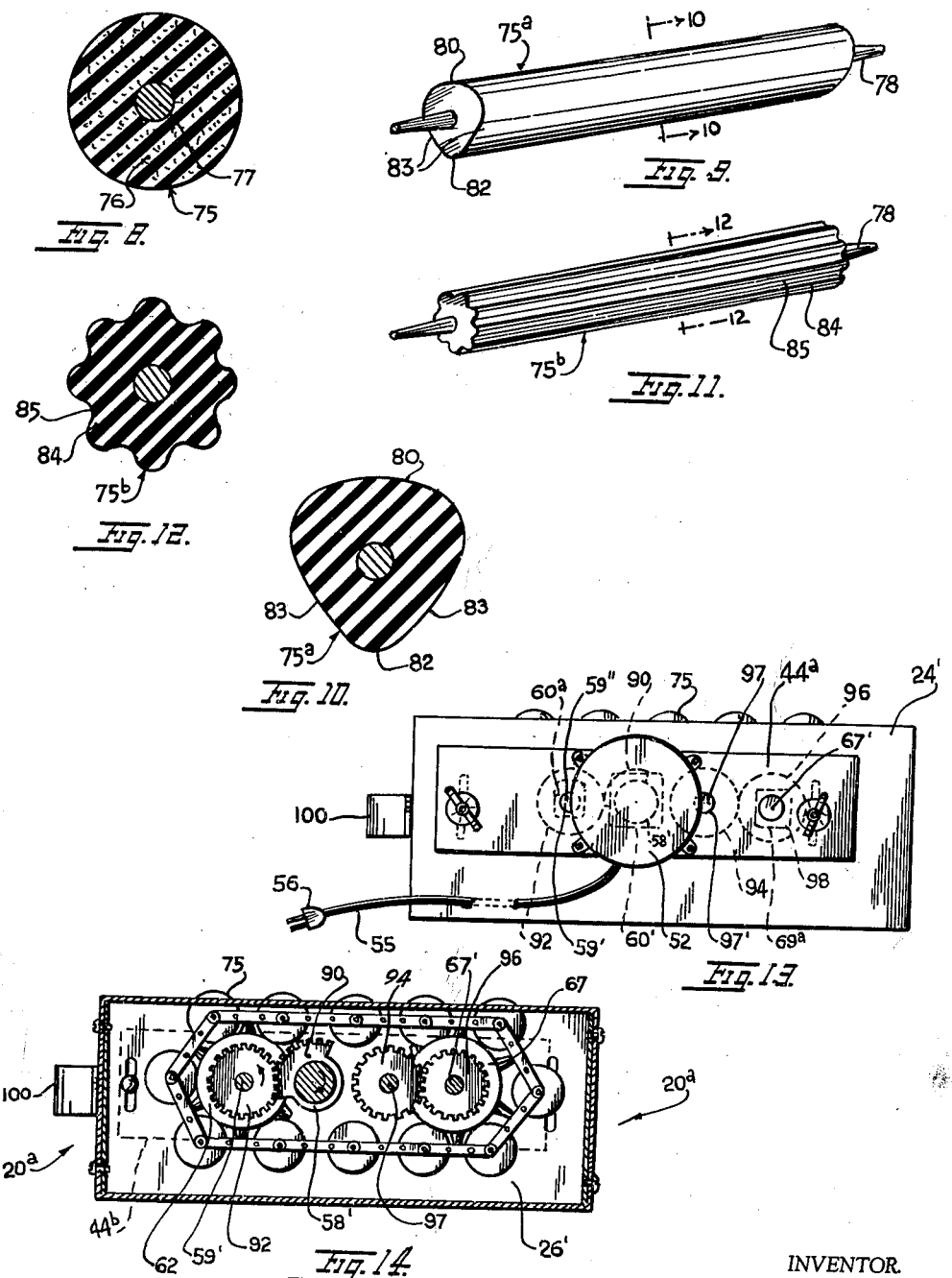

3,128,761
ROLLER MASSAGING MACHINE
Robert D. Smith, 2742 E. Tremont Ave., Bronx 61, N.Y.
Filed Oct. 22, 1962, Ser. No. 231,997
14 Claims. (Cl. 128—58)

This invention concerns a portable massaging machine.

According to the invention there is provided a portable massaging machine including a plurality of freely turning removable and interchangeable massage rollers carried by a pair of endless chains in a casing having an open top. The chains are engaged on gears carried by rotatable shafts. One of the shafts is driven by a motor mounted at one end of the casing. The entire assembly of motor, shafts, gears, chains and rollers is adjustable so that the rollers can project desired distances out of the casing. The motor drives the rollers across the casing continuously. The drive mechanism can be provided with supplementary gears so that the rollers move alternately in opposite directions across the open top of the casing. The rollers may have different cross-sectional shapes to produce different massaging effects.

It is therefore a principal object of the invention to provide a portable massage device including removable and interchangeable rollers movable on chains across an open casing, the chains being driven by a motor and drive gears.

Another object is to provide a portable massage device as described, wherein the drive mechanism for the chains includes gears arranged to effect cyclical reversing movements of the rollers.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 3 is a sectional view on a reduced scale taken on line 3—3 of FIG. 1.

FIG. 4 is a sectional view taken on line 4—4 of FIG. 2.

FIG. 5 is a fragmentary sectional view on an enlarged scale taken on line 5—5 of FIG. 3, parts being broken away.

FIG. 6 is another fragmentary sectional view on an enlarged scale taken on line 6—6 of FIG. 3.

FIG. 7 is a perspective view of an end cover of the device.

FIG. 8 is a sectional view taken on line 8—8 of FIG. 5.

FIGS. 9 and 11 are perspective views of different massage rollers.

FIGS. 10 and 12 are sectional views on an enlarged scale taken on lines 10—10 and 12—12 of FIGS. 9 and 11, respectively.

Figure 2:
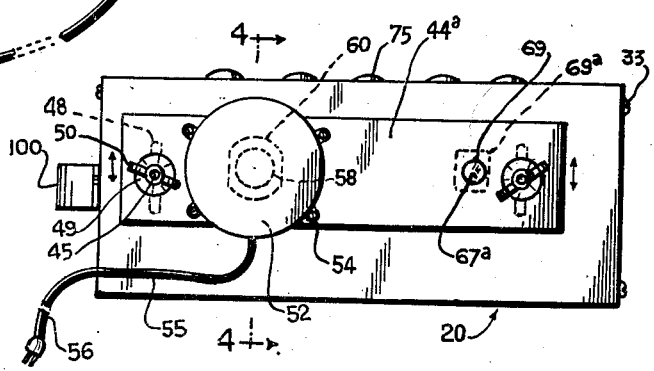
FIG. 2 is an end view of the device on a reduced scale.

FIG. 13 is an end view similar to FIG. 2, of another massage device according to the invention.

FIG. 14 is a sectional view similar to FIG. 3 of the massage device of FIG. 13.

Referring to the drawings, there is shown in FIGS. 1–4 a massage device 20 including a rectangular casing 22 having opposite open ends closed by removable covers 24, 26. The casing has a rectangular opening 28 in its top 29. The opening is defined between a narrow marginal top wall portion 30, a wider top wall portion 32, and transverse top flanges 34, 36 of covers 24, 26. The flanges 34, 36 are coplanar with wall portions 30 and 32. The covers have side flanges 38 which are secured by screws 33 to offset ends of side walls 40 and 42 of the casing. The end covers can be removed from the casing by removing screws 33. The casing has a closed flat bottom 31.

Mounted on the opposed covers are two opposed flat plates 44ª, 44ᵇ. These plates have holes near ends thereof through which are inserted bolts 45. The heads 46 of the bolts bear on opposite edges of slots 48 formed in the covers. These slots are shown to best advantage in FIGS. 3 and 7. Wing nuts 50 are engaged on bolts 45 with washers 49 between the nuts and plates 44ª, 44ᵇ. When the nuts are loosened the plates can be moved in their planes up or down between the upper flanges 34, 36 and lower flanges 35, 37 of the respective covers 24, 26.

A motor 52 is secured by screws 54 to a plate 44ª. This motor has a power cord 55 terminating in a plug 56 which can be inserted in a suitable power outlet. Motor 52 has a shaft 58 which passes through a hole 51 in plate 44ª and through an elongated hole or slot 60 in the cover 24. Shaft 58 is secured to a shaft 59 which carries two sprockets or drive gears 62ª, 62ᵇ. The distal end of shaft 59 is journaled in a hole 63 in plate 26. Shaft 59 passes through slot 61 in cover 26. The teeth 64 of gears 62ª, 62ᵇ are engaged in links 65 of endless chains 66ª, 66ᵇ. Gears 62ª, 62ᵇ are located at one looped end of the chains. At the other looped end of the chains are other sprockets or gears 67 carried near opposite ends of an idler shaft 67ª journaled in holes 69 in plates 44ª, 44ᵇ, and passing through slots 69ª in the covers 24, 26. The teeth of the several sprockets or gears are engaged between pairs of pins 68 extending between opposite sides of the links; see FIGS. 3 and 6.

The links are pivotally joined together at their ends by cylindrical thrust bearing members 70; see FIG. 5. Each bearing member 70 has two spaced circumferential grooves 72. In one groove is engaged one end of one side 71ª of one link and one end of one side 73ª of the adjacent link. In the other groove is engaged the other end of the opposite side 71ᵇ of the one link and the other end of opposite side 73ᵇ of the other link. In each bearing member is a race 70′ in which are engaged ball bearings 74.

The device has a plurality of cylindrical massage rollers 75. Each roller has a cylindrical body 76 which may be of soft or hard rubber, plastic or other material of predetermined resiliency. A cylindrical shaft 77 extends through body 76; see FIGS. 5, 6 and 8. The shaft has conical or tapered opposite ends 78 which are engaged in the bearing members 70 which join the links. The roller bearings 74 permit the rollers to rotate freely when contacted by any part of a person's body while the device is in use. The rollers are held in the chains and move in a straight course from left to right across the open top 29 of the casing, as seen in FIG. 3, when shaft 58 rotates clockwise. The rollers then move round the drive gears 67 at the right end loops of the chains, then in a straight course from right to left inside the casing, and then around drive gears 62ª, 62ᵇ at the left loop of the chains upwardly to the straight course at the open top of the casing. The rollers travel continuously across the open top of the casing as long as the motor operates.

The user can place the device against any portion of his body while it is in operation. The rollers 75 will effect a kneading or massaging action as the rollers rotate in frictional contact with his body while moving across the device.

FIGS. 9 and 10 show another form of massage roller 75ª which has one side 80 with a larger radius of curvature, an opposite side 82 with a smaller radius of curvature, and two opposed sides 83 which are only slightly curved with very large radii of curvature. This type of roller may be interchanged with any one or all of the rollers 75 and will effect a more vigorous kneading somewhat simulating a manual massaging action. This roller has opposite conical ends 78 which engage in bearing members 70.

FIGS. 11 and 12 show another massage roller 75$^b$ in which the roller has a plurality of alternating longitudinal ridges 84 and grooves 85. The surface of the roller is sinusoidal in cross section. The ridges and grooves are smoothly curved. These ridges and grooves will effect a still more vigorous massage action when substituted for rollers 75 or 75$^a$ in the device 20. Roller 75$^b$ has conical ends 78 like rollers 75 and 75$^a$.

In FIGS. 13 and 14 is shown another massage device 20$^a$ which is similar to device 20 and corresponding parts are identically numbered.

In device 20$^a$, motor 52 is secured to plate 44$^{a\prime}$ and has a sector gear 90 at the inner end of its shaft 58$'$. Sector gear 90 has teeth which extend arcuately somewhat less than 180°. The teeth of the gear 90 engage teeth of a drive gear 92 mounted on shaft 59$'$. Shaft 59$'$ carries the sprockets 62 which engage the two chains carrying the rollers 75. Another drive gear 94 is mounted on a shaft 97 journaled in holes 97$'$ in the opposing plates 44$^{a\prime}$, 44$^{b\prime}$ on the opposite end covers 24$'$, 26$'$. Gear 94 is engaged by the sector gear 90 only when gear 90 is out of engagement with gear 92. Gear 94 is engaged with another drive gear 96 mounted on shaft 67$'$ which carries the other sprockets 67. Shaft 59$'$ is journaled in holes 59$''$ in the opposed plates 44$^{a\prime}$, 44$^{b\prime}$ and passes through opposing slots 60$^a$ formed in the covers 24$'$, 26$'$. Shaft 58$'$ of motor 52 passes through a hole in plate 44$^{a\prime}$ and through a slot 60$'$ in plate 44$^{a\prime}$. Shaft 97 passes through slots 98 in the walls of the two covers. The several slots in the covers permit the plates to be adjusted up or down to project rollers 75, 75$^a$ or 75$^b$ different distances out of the open side of the casing.

The drive mechanism including gears 90, 92, 94 and 96 is so arranged that while the motor shaft 58$'$ rotates continuously in one direction, such as clockwise as indicated in FIG. 14, it will turn gear 90 counterclockwise for less than one half of a revolution and will then turn gear 94 counterclockwise for less than one half of a revolution. While gear 94 is turning it drives gear 96 clockwise. The driving force is transmitted from the motor alternately to shafts 59$'$ and 97, 67$'$ during each revolution of the motor shaft, and the chains are driven alternately in opposite directions. The rollers 75 move alternately in opposite directions across the open side of the casing. This alternation is automatic and continuous as long as the motor is energized. The device 20$^a$ is otherwise identical to device 20 and operates in the same way to effect a mild or vigorous body massage depending on the types of rollers used.

The devices described can be made in any desired sizes. One suggested convenient size for ready portability and ease in handling will have a casing including covers about fourteen inches in length measured axially of the rollers. The device will be about eleven inches in width measured perpendicularly to the axes of the rollers and a depth of about five inches. The rollers may be about twelve inches long and about one inch in diameter. The casing and covers may be made of light metal such as aluminum.

Figure 1:
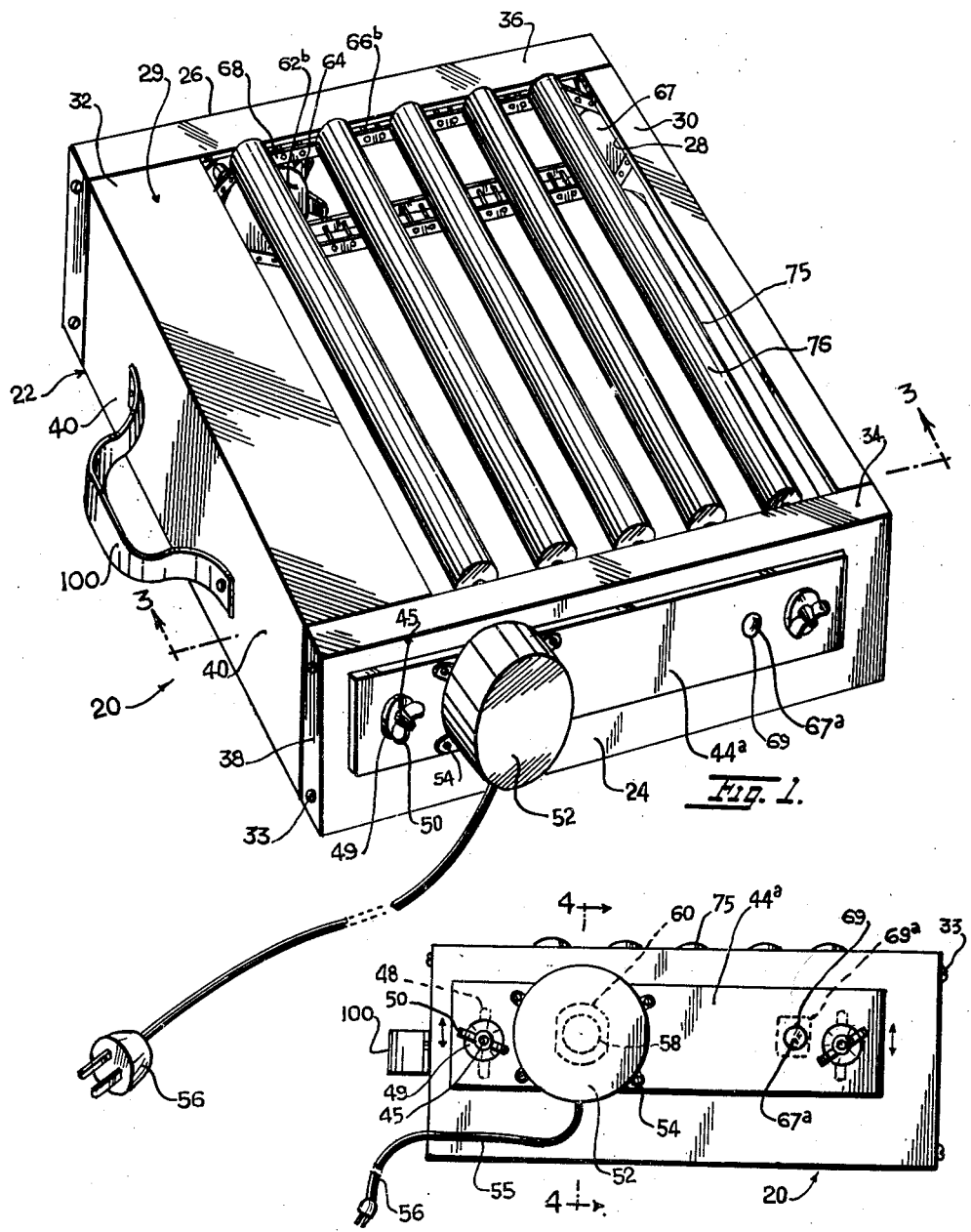
FIG. 1 is a perspective view of a device embodying the invention.

A handle 100 may be provided on one wall 40 of the casing, as shown in FIGS. 1–3, for convenience in carrying the device. The motor may be of any desired size. A fractional horsepower motor of the order of $\frac{1}{10}$ to $\frac{1}{5}$ horsepower will be satisfactory for most purposes.

The device described is easily assembled and disassembled for replacement of rollers and servicing. It is durable and long lasting, and a useful accessory of general utility.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A portable massage device, comprising a rectangular casing having an open top, open ends, a closed bottom and closed sides, a pair of covers removably secured to the open ends of the casing and closing the same, a pair of supporting plates adjustably mounted on the covers respectively, a pair of endless chains movable in parallel planes inside the casing, freely rotatable rollers carried by the chains and movable in a straight course across the open top of the casing while projecting therethrough, sprockets carrying the chains at opposite end loops thereof, shafts carrying the sprockets and being rotatably carried by said plates, and a motor mounted on one of the plates and operatively engaged with one of the shafts to turn the same whereby the rollers are driven across the casing while the motor is energized.

2. A portable massage device, comprising a rectangular casing having an open top, open ends, a closed bottom and closed sides, a pair of covers removably secured to the open ends of the casing and closing the same, a pair of supporting plates adjustably mounted on the covers respectively, a pair of endless chains movable in parallel planes inside the casing, freely rotatable rollers carried by the chains and movable in a straight course across the open top of the casing while projecting therethrough, sprockets carrying the chains at opposite end loops thereof, shafts carrying the sprockets and being rotatably carried by said plates, and a motor mounted on one of the plates and operatively engaged with one of the shafts to turn the same whereby the rollers are driven across the casing while the motor is energized, said covers having slots therein, said shafts extending through the slots, so that the rollers can be adjustably projected through the open top of the casing when the plates are adjusted on the covers.

3. A portable massage device, comprising a rectangular casing having an open top, open ends, a closed bottom and closed sides, a pair of covers removably secured to the open ends of the casing and closing the same, a pair of supporting plates adjustably mounted on the covers respectively, a pair of endless chains movable in parallel planes inside the casing, freely rotatable rollers carried by the chains and movable in a straight course across the open top of the casing while projecting therethrough, sprockets carrying the chains at opposite end loops thereof, shafts carrying said sprockets and being rotatably carried by the plates, first and second drive gears carried by the respective shafts, another shaft rotatably carried by the plates, a third gear carried by said other shaft and engaged with the second gear, a motor mounted on one of the plates, and a sector gear connected to and driven by the motor, said sector gear alternately engaging and driving the first and third gears, whereby the rollers are alternately driven in opposite directions across the open top of the casing while the motor is energized.

4. A portable massage device, comprising a rectangular casing having an open top, open ends, a closed bottom and closed sides, a pair of covers removably secured to the open ends of the casing and closing the same, a pair of supporting plates adjustably mounted on the covers respectively, a pair of endless chains movable in parallel planes inside the casing, freely rotatable rollers carried by the chains and movable in a straight course across the open top of the casing while projecting therethrough, sprockets carrying the chains at opposite end loops thereof, shafts carrying said sprockets and being rotatably carried by the plates, first and second drive gears carried by the respective shafts, another shaft rotatably carried by the plates, a third gear carried by said other shaft and engaged with the second gear, a motor mounted on one of the plates, and a sector gear connected to and driven by the motor, said sector gear alternately engaging and driving the first and third gears, whereby the rollers are alternately driven in opposite directions across the open top of the casing while the motor is energized, said covers having slots therein, said shafts extending through the slots, so that the rollers can be adjustably projected through the open top of the casing when the plates are adjusted on the covers.

5. A portable massage device, comprising a rectangular casing having an open top, open ends, a closed bottom and closed sides, a pair of covers removably secured to the open ends of the casing and closing the same, a pair of supporting plates adjustably mounted on the covers respectively, a pair of endless chains movable in parallel planes inside the casing, freely rotatable rollers carried by the chains and movable in a straight course across the open top of the casing while projecting therethrough, sprockets carrying the chains at opposite end loops thereof, shafts carrying the sprockets and being rotatably carried by said plates, and a motor mounted on one of the plates and operatively engaged with one of the shafts to turn the same whereby the rollers are driven across the casing while the motor is energized, each of said chains having links pivotally connected by bearing members, each of the rollers having shaft ends rotatably engaged in said bearing members whereby the rollers rotate upon contact with a portion of a body of a person being massaged.

6. A portable massage device, comprising a rectangular casing having an open top, open ends, a closed bottom and closed sides, a pair of covers removably secured to the open ends of the casing and closing the same, a pair of supporting plates adjustably mounted on the covers respectively, a pair of endless chains movable in parallel planes inside the casing, freely rotatable rollers carried by the chains and movable in a straight course across the open top of the casing while projecting therethrough, sprockets carrying the chains at opposite end loops thereof, shafts carrying the sprockets and being rotatably carried by said plates, and a motor mounted on one of the plates and operatively engaged with one of the shafts to turn the same whereby the rollers are driven across the casing while the motor is energized, said covers having slots therein, said shafts extending through the slots, so that the rollers can be adjustably projected through the open top of the casing when the plates are adjusted on the covers, each of the chains having links pivotally connected by bearing members, each of the rollers having shaft ends rotatably engaged in said bearing members whereby the rollers rotate upon contact with a portion of a body of a person being massaged.

7. A portable massage device, comprising a rectangular casing having an open top, open ends, a closed bottom and closed sides, a pair of covers removably secured to the open ends of the casing and closing the same, a pair of supporting plates adjustably mounted on the covers respectively, a pair of endless chains movable in parallel planes inside the casing, freely rotatable rollers carried by the chains and movable in a straight course across the open top of the casing while projecting therethrough, sprockets carrying the chains at opposite end loops thereof, shafts carrying said sprockets and being rotatably carried by the plates, first and second drive gears carried by the respective shafts, another shaft rotatably carried by the plates, a third gear carried by said other shaft and engaged with the second gear, a motor mounted on one of the plates, and a sector gear connected to and driven by the motor, said sector gear alternately engaging and driving the first and third gears, whereby the rollers are alternately driven in opposite directions across the open top of the casing while the motor is energized, each of the chains having links pivotally connected by bearing members, each of the rollers having shaft ends rotatably engaged in said bearing members whereby the rollers rotate upon contact with a portion of a body of a person being massaged.

8. A portable massage device, comprising a rectangular casing having an open top, open ends, a closed bottom and closed sides, a pair of covers removably secured to the open ends of the casing and closing the same, a pair of supporting plates adjustably mounted on the covers respectively, a pair of endless chains movable in parallel planes inside the casing, freely rotatable rollers carried by the chains and movable in a straight course across the open top of the casing while projecting therethrough, sprockets carrying the chains at opposite end loops thereof, shafts carrying said sprockets and being rotatably carried by the plates, first and second drive gears carried by the respective shafts, another shaft rotatably carried by the plates, a third gear carried by said other shaft and engaged with the second gear, a motor mounted on one of the plates, and a sector gear connected to and driven by the motor, said sector gear alternately engaging and driving the first and third gears, whereby the rollers are alternately driven in opposite directions across the open top of the casing while the motor is energized, said covers having slots therein, said shafts extending through the slots, so that the rollers can be adjustably projected through the open top of the casing when the plates are adjusted on the covers, each of the chains having links pivotally connected by bearing members, each of the rollers having shaft ends rotatably engaged in said bearing members whereby the rollers rotate upon contact with a portion of a body of a person being massaged.

9. A portable massage device, comprising a rectangular casing having an open top, open ends, a closed bottom and closed sides, a pair of covers removably secured to the open ends of the casing and closing the same, a pair of supporting plates adjustably mounted on the covers respectively, a pair of endless chains movable in parallel planes inside the casing, freely rotatable rollers carried by the chains and movable in a straight course across the open top of the casing while projecting therethrough, sprockets carrying the chains at opposite end loops thereof, shafts carrying the sprockets and being rotatably carried by said plates, and a motor mounted on one of the plates and operatively engaged with one of the shafts to turn the same whereby the rollers are driven across the casing while the motor is energized, said covers having slots therein, said shafts extending through the slots, so that the rollers can be adjustably projected through the open top of the casing when the plates are adjusted on the covers, each of the chains having links pivotally connected by bearing members, each of the rollers having shaft ends rotatably engaged in said bearing members whereby the rollers rotate upon contact with a portion of a body of a person being massaged, each of the rollers having a cylindrical body with a shaft extending therethrough, the shaft ends of the rollers being conical and disposed near the respective covers, whereby the rollers are removable from said bearing members and interchangeable with other rollers when the covers are removed from the casing.

10. A portable massage device, comprising a rectangular casing having an open top, open ends, a closed bottom and closed sides, a pair of covers removably secured to the open ends of the casing and closing the same, a pair of supporting plates adjustably mounted on the covers respectively, a pair of endless chains movable in parallel planes inside the casing, freely rotatable rollers carried by the chains and movable in a stranght course across the open top of the casing while projecting therethrough, sprockets carrying the chains at opposite end loops thereof, shafts carrying the sprockets and being rotatably carried by said plates, and a motor mounted on one of the plates and operatively engaged with one of the shafts to turn the same whereby the rollers are driven across the casing while the motor is energized, said covers having slots therein, said shafts extending through the slots, so that the rollers can be adjustably projected through the open top of the casing when the plates are adjusted on the covers, each of the chains having links pivotally connected by bearing members, each of the rollers having shaft ends rotatably engaged in said bearing members whereby the rollers rotate upon contact with a portion of a body of a person being massaged, each of the rollers having a non-circular cross section throughout its axial length for effecting massaging action when the rollers rotate.

11. A portable massage device, comprising a rectangular casing having an open top, open ends, a closed bottom and closed sides, a pair of covers removably secured to the open ends of the casing and closing the same, a pair of supporting plates adjustably mounted on the covers respectively, a pair of endless chains movable in parallel planes inside the casing, freely rotatable rollers carried by the chains and movable in a straight course across the open top of the casing while projecting therethrough, sprockets carrying the chains at opposite end loops thereof, shafts carrying said sprockets and being rotatably carried by the plates, first and second drive gears carried by the respective shafts, another shaft rotatably carried by the plates, a third gear carried by said other shaft and engaged with the second gear, a motor mounted on one of the plates, and a sector gear connected to and driven by the motor, said sector gear alternately engaging and driving the first and third gears, whereby the rollers are alternately driven in opposite directions across the open top of the casing while the motor is energized, said covers having slots therein, said shafts extending through the slots, so that the rollers can be adjustably projected through the open top of the casing when the plates are adjusted on the covers, each of the chains having links pivotally connected by bearing members, each of the rollers having shaft ends rotatably engaged in said bearing members whereby the rollers rotate upon contact with a portion of a body of a person being massaged, at least one of the rollers having a noncircular cross section throughout its axial length for effective massaging action when the rollers rotate.

12. A portable massage device, comprising a rectangular casing having an open top, open ends, a closed bottom and closed sides, a pair of covers removably secured to the open ends of the casing and closing the same, a pair of supporting plates adjustably mounted on the covers respectively, a pair of endless chains movable in parallel planes inside the casing, freely rotatable rollers carried by the chains and movable in a straight course across the open top of the casing while projecting therethrough, sprockets carrying the chains at opposite end loops thereof, shafts carrying said sprockets and being rotatably carried by the plates, first and second drive gears carried by the respective shafts, another shaft rotatably carried by the plates, a third gear carried by said other shaft and engaged with the second gear, a motor mounted on one of the plates, and a sector gear connected to and driven by the motor, said sector gear alternately engaging and driving the first and third gears, whereby the rollers are alternately driven in opposite directions across the open top of the casing while the motor is energized, said covers having slots therein, said shafts extending through the slots, so that the rollers can be adjustably projected through the open top of the casing when the plates are adjusted on the covers, each of the chains having links pivotally connected by bearing members, each of the rollers having shaft ends rotatably engaged in said bearing members whereby the rollers rotate upon contact with a portion of a body of a person being massaged, at least one of the rollers having a noncircular cross section throughout its axial length for effective massaging action when the rollers rotate, each of the shaft ends of the rollers being conical in form and disposed near the respective covers, whereby the rollers are easily removable from the bearing members in the chains for interchanging with other rollers when the covers are removed from the casing.

13. A portable massage device, comprising a rectangular casing having an open top, open ends, a closed bottom and closed sides, a pair of covers removably secured to the open ends of the casing and closing the same, a pair of supporting plates adjustably mounted on the covers respectively, a pair of endless chains movable in parallel planes inside the casing, freely rotatable rollers carried by the chains and movable in a straight course across the open top of the casing while projecting therethrough, sprockets carrying the chains at opposite end loops thereof, shafts carrying the sprockets, a motor mounted on one of the plates, and automatically reversing drive means operatively connected between the sprockets and motor for driving the rollers across the open top of the casing when the motor is energized.

14. A portable massage device, comprising a rectangular casing having an open top, open ends, a closed bottom and closed sides, a pair of covers removably secured to the open ends of the casing and closing the same, a pair of supporting plates adjustably mounted on the covers respectively, a pair of endless chains movable in parallel planes inside the casing, freely rotatable rollers carried by the chains and movable in a straight course across the open top of the casing while projecting therethrough, sprockets carrying the chains at opposite end loops thereof, shafts carrying the sprockets, a motor mounted on one of the plates, and automatically reversing drive means operatively connected between the sprockets and motor for driving the rollers across the open top of the casing when the motor is energized, each of said chains having links pivotally connected by bearing members, each of the rollers having shaft ends rotatably engaged in said bearing members whereby the rollers rotate upon contact with a portion of a body of a person being massaged.

References Cited in the file of this patent

UNITED STATES PATENTS

| | | |
|---|---|---|
| 2,657,686 | Brandenfels | Nov. 3, 1953 |
| 2,781,040 | Hill | Feb. 12, 1957 |
| 2,819,714 | London | Jan. 14, 1958 |
| 3,023,749 | Baume | Mar. 6, 1962 |